United States Patent
Usami et al.

(10) Patent No.: US 12,012,078 B2
(45) Date of Patent: Jun. 18, 2024

(54) VEHICLE CLEANER

(71) Applicants: KOITO MANUFACTURING CO., LTD., Tokyo (JP); TOYOTA JIDOSHA KABUSHIKI KAISHA, Aichi (JP)

(72) Inventors: Atsushi Usami, Miyoshi (JP); Masaru Sakai, Shizuoka (JP); Yasuhiro Ichikawa, Shizuoka (JP)

(73) Assignees: KOITO MANUFACTURING CO., LTD., Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 369 days.

(21) Appl. No.: 17/425,162

(22) PCT Filed: Jan. 7, 2020

(86) PCT No.: PCT/JP2020/000159
§ 371 (c)(1),
(2) Date: Jul. 22, 2021

(87) PCT Pub. No.: WO2020/153115
PCT Pub. Date: Jul. 30, 2020

(65) Prior Publication Data
US 2022/0118949 A1    Apr. 21, 2022

(30) Foreign Application Priority Data
Jan. 25, 2019 (JP) .................... 2019-011272

(51) Int. Cl.
*B60S 1/52* (2006.01)
*B05B 9/04* (2006.01)
(Continued)

(52) U.S. Cl.
CPC .............. *B60S 1/52* (2013.01); *B05B 9/0413* (2013.01); *B05B 9/0426* (2013.01);
(Continued)

(58) Field of Classification Search
CPC .... B60S 1/60; B60S 1/52; B60S 1/528; B05B 9/0413; B05B 9/0426; B05B 13/0278; B05B 13/005
See application file for complete search history.

(56) References Cited

U.S. PATENT DOCUMENTS 3,127,116 A * 3/1964 Pollock et al. ....... B60T 17/226
239/284.2
7,182,276 B2 * 2/2007 Sakai ...................... B60S 1/528
239/284.1
(Continued)

FOREIGN PATENT DOCUMENTS

CN        101746359 A      6/2010
DE  10 2010 025 193 A1    12/2011
(Continued)

OTHER PUBLICATIONS

Extended European Search Report dated Feb. 17, 2022, issued by the European Patent Office in counterpart European Patent Application No. 20744715.2.
(Continued)

*Primary Examiner* — Benjamin L Osterhout
(74) *Attorney, Agent, or Firm* — Sughrue Mion, PLLC (57) ABSTRACT

A vehicle cleaner includes a cylinder, a piston, a nozzle holder, a nozzle and a nozzle cover. The nozzle cover includes a cover portion that closes an opening formed in a part of a vehicle body panel of a vehicle, and an engaging portion that protrudes from the cover portion toward the piston and engages with the nozzle holder. The engaging portion is provided with a concave portion for lance engage-
(Continued)

ment on one surface, and an abutting rib on the other surface of the engaging portion opposite to the one surface. The nozzle holder is provided with a first convex portion that engages with the concave portion on one surface, and a first abutted rib against which the abutting rib abuts on the other surface of the nozzle holder opposite to the one surface.

6 Claims, 10 Drawing Sheets

(51) Int. Cl.
  *B05B 13/00*   (2006.01)
  *B05B 13/02*   (2006.01)
  *B60S 1/60*   (2006.01)

(52) U.S. Cl.
  CPC ........ *B05B 13/005* (2013.01); *B05B 13/0278* (2013.01); *B60S 1/528* (2013.01); *B60S 1/60* (2013.01)

(56) References Cited

U.S. PATENT DOCUMENTS

| | | | | |
|---|---|---|---|---|
| 7,434,748 | B2 * | 10/2008 | Takada | B60S 1/52 239/587.2 |
| 7,699,244 | B2 * | 4/2010 | Sakai | B60S 1/603 15/250.002 |
| 7,891,582 | B2 * | 2/2011 | Baba | B60S 1/528 239/284.2 |
| 8,876,019 | B2 * | 11/2014 | Discher | B60S 1/528 239/533.1 |
| 10,183,654 | B2 * | 1/2019 | Jeanton | B60S 1/46 |
| 11,097,694 | B2 * | 8/2021 | Rachow | B60S 1/481 |
| 2003/0116645 | A1 * | 6/2003 | Hirose | B60S 1/528 239/284.2 |
| 2006/0027678 | A1 * | 2/2006 | Kimura | B60S 1/603 239/284.2 |
| 2006/0113404 | A1 | 6/2006 | Sato et al. | |
| 2006/0273139 | A1 | 12/2006 | Sakai et al. | |
| 2015/0078940 | A1 * | 3/2015 | Kikuta | F04B 17/03 417/443 |
| 2016/0339875 | A1 * | 11/2016 | Ina | B60S 1/522 |
| 2018/0304862 | A1 | 10/2018 | Picot et al. | |
| 2018/0370499 | A1 * | 12/2018 | Picot | B08B 3/02 |
| 2019/0084530 | A1 * | 3/2019 | Kimura | B60S 1/528 |
| 2019/0283714 | A1 * | 9/2019 | Ichikawa | B08B 3/02 |
| 2019/0283715 | A1 * | 9/2019 | Sakai | B60S 1/522 |

FOREIGN PATENT DOCUMENTS

| | | |
|---|---|---|
| EP | 2 045 154 A2 | 4/2009 |
| EP | 2511144 A2 | 10/2012 |
| EP | 2933154 A1 | 10/2015 |
| JP | 2006-151151 A | 6/2006 |
| JP | 2006335275 A | 12/2006 |
| JP | 2010030488 A | 2/2010 |
| JP | 2010-264891 A | 11/2010 |
| JP | 2012218657 A | 11/2012 |
| JP | 2012218706 A | 11/2012 |
| JP | 2013220701 A | 10/2013 |
| JP | 2015202774 A | 11/2015 |
| JP | 2018199483 A | 12/2018 |
| JP | 201951893 A | 4/2019 |
| JP | 2019182043 A | 10/2019 |

OTHER PUBLICATIONS

Communication issued by the China National Intellectual Property Administration on May 10, 2023 for Chinese Patent Application No. 202080009699.1.
International Search Report (PCT/ISA/210) dated Mar. 24, 2020 issued by the International Searching Authority in International Application No. PCT/JP2020/000159.
Written Opinion (PCT/ISA/237) dated Mar. 24, 2020 issued by the International Searching Authority in International Application No. PCT/JP2020/000159.

* cited by examiner

VEHICLE CLEANER

TECHNICAL FIELD

The present disclosure relates to a vehicle cleaner.

BACKGROUND ART

Examples of a cleaning device for a vehicle lamp include headlamp cleaners known in Patent Literatures 1 to 3 and the like.

CITATION LIST

Patent Literature

Patent Literature 1: JP2012-218657A
Patent Literature 2: JP2013-220701A
Patent Literature 3: JP2015-202774A

SUMMARY OF INVENTION

Technical Problem

In the headlamp cleaners as disclosed in Patent Literatures 1 to 3, there is room for improvement in the ease of assembly of components.

An object of the present disclosure is to provide a vehicle cleaner that can improve the ease of assembly of a nozzle cover to a nozzle holder that supports a nozzle.

Solution to Problem

In order to achieve the above object, a vehicle cleaner of the present disclosure includes:
  a cylinder provided in an opening formed in a part of a vehicle body panel of a vehicle;
  a piston supported to be movable forward and backward relative to the cylinder;
  a nozzle holder provided in a vicinity of a front end of the piston;
  a nozzle supported by the nozzle holder and configured to inject a cleaning liquid to an object to be cleaned of the vehicle in a state where the piston protrudes from the opening; and
  a nozzle cover provided at a front end of the nozzle holder and configured to close the opening in a state where the piston is drawn into the cylinder.

The nozzle cover includes a cover portion that closes the opening, and an engaging portion protruding from the cover portion toward the piston and engaged with the nozzle holder.

The engaging portion is provided with a concave portion for lance engagement on one surface, and an abutting rib on the other surface of the engaging portion opposite to the one surface.

The nozzle holder is provided with a first convex portion that engages with the concave portion on one surface, and a first abutted rib against which the abutting rib abuts on the other surface of the nozzle holder opposite to the one surface.

According to the present disclosure, the nozzle cover can be engaged with the nozzle holder by lance engagement, and on a side opposite to the lance engagement portion, the abutting rib provided on the engaging portion of the nozzle cover abuts against the abutted rib provided on the nozzle holder. For this reason, it is possible to improve the ease of assembly of the nozzle cover to the nozzle holder.

In the vehicle cleaner according to the present disclosure, the first abutted rib may be provided on a rear end side of the piston relative to the first convex portion.

According to this configuration, for example, when a gouging force in a direction of the other surface opposite to the one surface in lance engagement is applied to the cover portion of the nozzle cover, the abutting rib abuts against the first abutted rib provided on the rear end side relative to the first convex portion. Accordingly, even when such a gouging force is applied, it is possible to prevent the nozzle cover from coming off the nozzle holder due to the disengagement between the first convex portion and the concave portion. That is, the holding strength of the nozzle cover by the nozzle holder can be improved.

In the vehicle cleaner according to the present disclosure, the nozzle holder may be provided with a second abutted rib extending from the first abutted rib to the rear end side of the piston in a position corresponding to the abutting rib.

According to this configuration, the abutting rib abuts against the second abutted rib in addition to the first abutted rib. Therefore, when a gouging force in the direction of the other surface is applied to the cover portion, the rear end portion of the abutting rib located on the rear end side in a piston advancing-and-retracting direction relative to the engagement portion of the first convex portion and the concave portion serves as a rotation center. For this reason, it is possible to more reliably prevent the nozzle cover from coming off the nozzle holder due to the disengagement between the first convex portion and the concave portion.

In the vehicle cleaner according to the present disclosure, the second abutted rib may include a pair of second abutted ribs separated by a predetermined distance, and the abutting rib may include a pair of abutting ribs in positions corresponding to the pair of second abutted ribs.

According to this configuration, the pair of abutting ribs abut against the pair of second abutted ribs, respectively. Therefore, it is possible to further improve the holding strength of the nozzle cover by the nozzle holder.

In the vehicle cleaner according to the present disclosure, the nozzle holder may be provided with a second convex portion for lance engagement on the other surface, and a third abutted rib on the one surface of the nozzle holder.

According to this configuration, the assembly direction of the nozzle cover to the nozzle holder is not limited, and thus versatility of the cleaner can be improved.

Advantageous Effects of Invention

According to the present disclosure, it is possible to provide a vehicle cleaner that can improve the ease of assembly of a nozzle cover to a nozzle holder that supports a nozzle.

DESCRIPTION OF EMBODIMENTS

An example of a vehicle cleaner according to an embodiment of the present disclosure will be described with reference to the drawings. Terms "left-right direction", "front-rear direction", and "up-down direction" in the present embodiment refer to relative directions set for convenience of description of the vehicle cleaner illustrated in the drawings.

Figure 1:
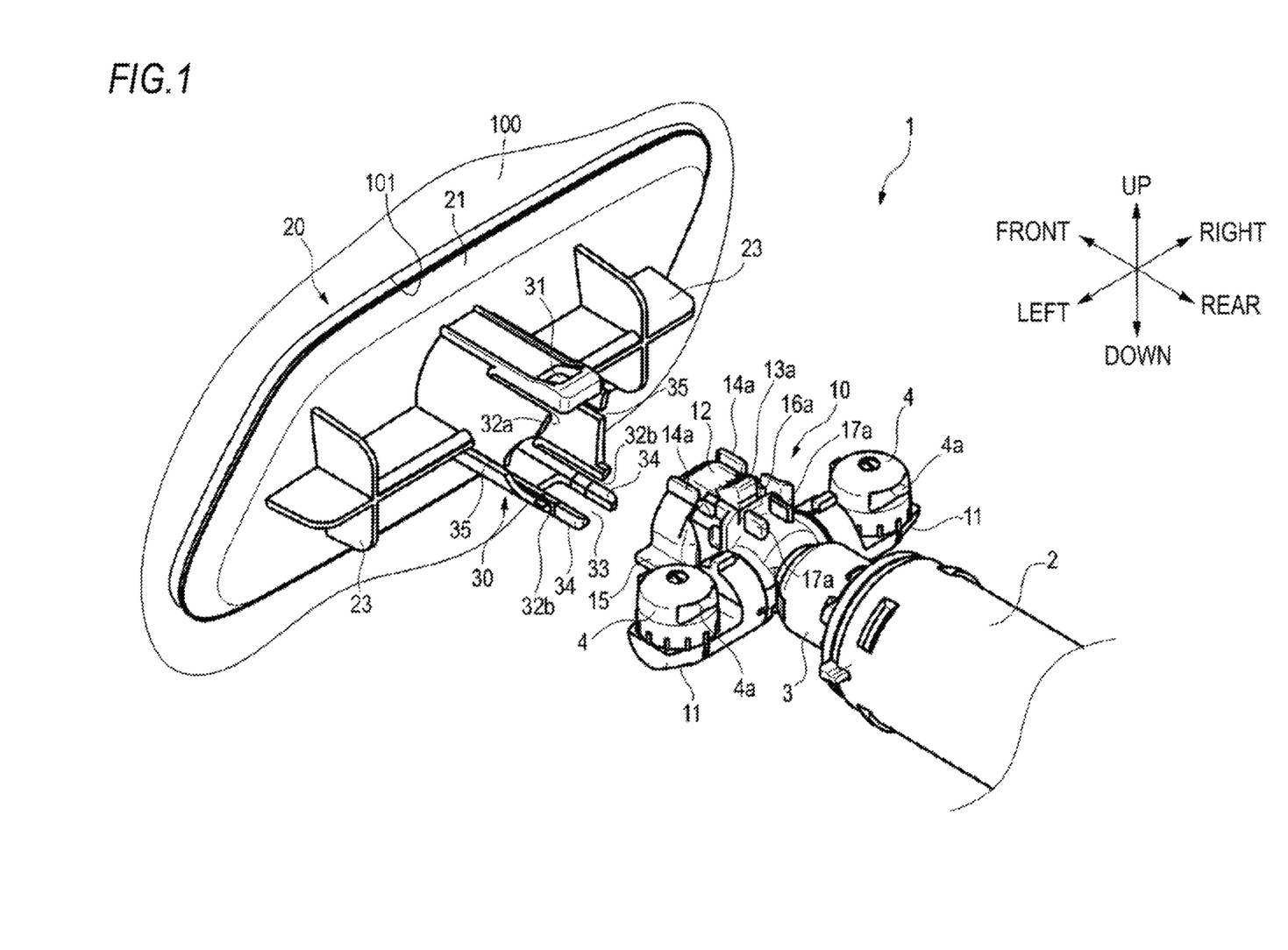
FIG. 1 is an exploded perspective view of a vehicle cleaner according to an embodiment of the present disclosure.
Figure 2:
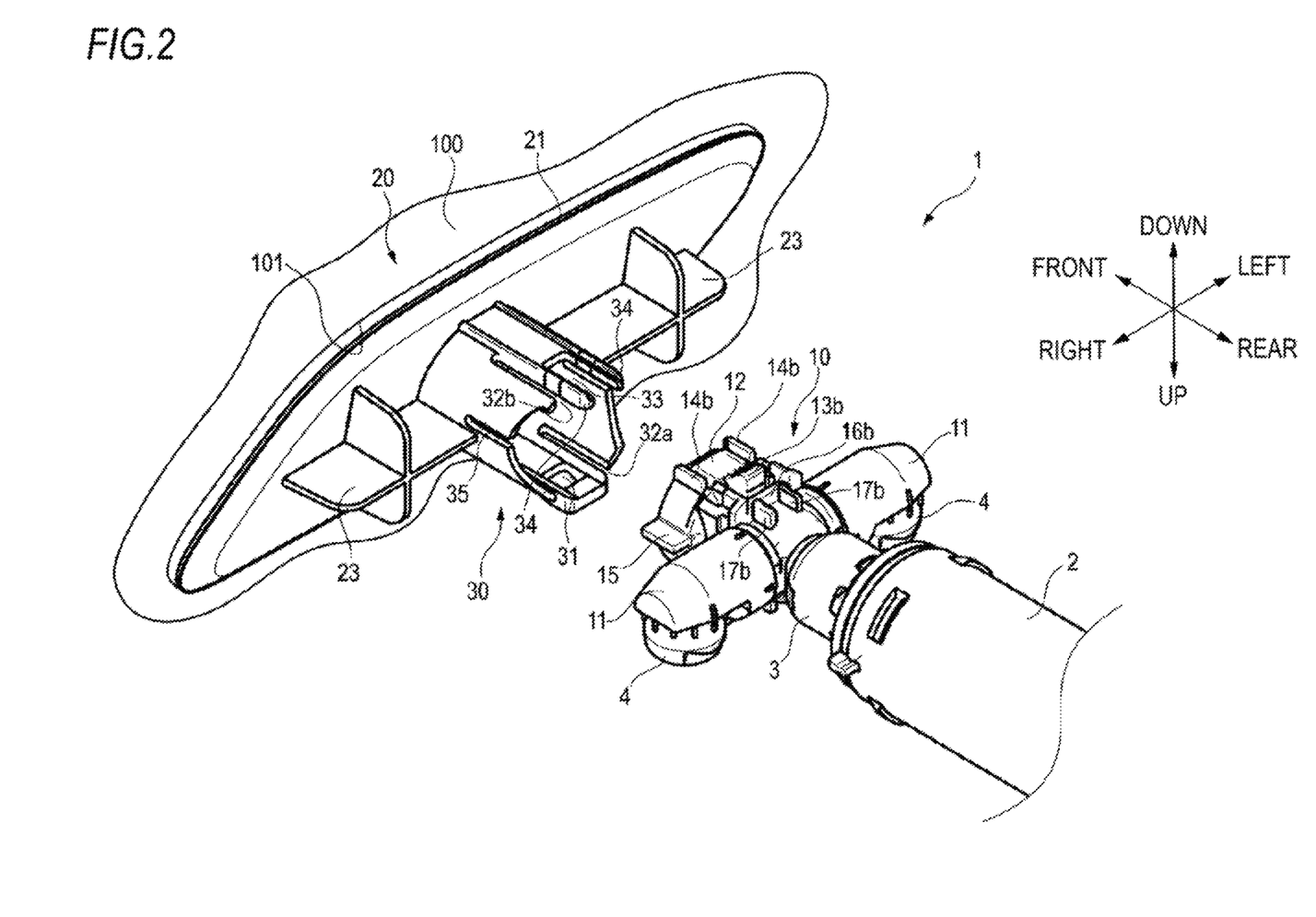
FIG. 2 is an exploded perspective view of the vehicle cleaner of FIG. 1 when viewed from another direction.

FIG. 1 is an exploded perspective view of a vehicle cleaner 1 (hereinafter referred to as the cleaner 1) that is attachable to a bumper 100 (example of a vehicle body panel) or the like of a vehicle. FIG. 2 is an exploded perspective view of the cleaner 1 illustrated in FIG. 1 when viewed front another direction. The cleaner 1 is a cleaner that sprays cleaning liquid onto a lamp (for example, a headlamp) mounted on a vehicle to remove dirt and snow adhering to the lamp, thereby cleaning the lamp.

The application of the cleaner 1 according to the present embodiment is not limited to the cleaning of a vehicle lamp. Alternatively, the cleaner 1 may be widely applied as a cleaner for cleaning portions that are objects to be cleaned provided in a vehicle, such as an in-vehicle sensor, a vehicle body, a window, and a mirror. Although the cleaner 1 is attachable to the bumper 100, the cleaner 1 may be attached to portions constituting a part of the vehicle, such as a vehicle body and a headlamp in addition to the bumper 100.

As illustrated in FIGS. 1 and 2, the cleaner 1 includes a cylinder 2 provided in an opening 101 formed in the bumper 100, a piston 3 supported to be movable in an axial direction (front-rear direction) of the cylinder 2, a nozzle holder 10 coupled to a front end portion of the piston 3, nozzles 4 supported by the nozzle holder 10, and a nozzle cover 20 attachable to the nozzle holder 10.

The cylinder 2 is formed in a substantially cylindrical shape extending in the front-rear direction. A rear end portion of the cylinder 2 is coupled to a coupling pipe (not illustrated). The coupling pipe is coupled to a storage tank that stores cleaning liquid. The storage tank is disposed inside the vehicle body. The cleaning liquid sent out from the storage tank flows into the cylinder 2 through the coupling pipe.

The piston 3 is formed in a substantially cylindrical shape extending in the front-rear direction. When the cleaner 1 is not in cleaning, a pan of the piston 3 except for the front end portion is inserted into the cylinder 2. That is, in a storage position, the front end portion of the piston 3 protrudes forward from the cylinder 2. The cleaning liquid flown into the cylinder 2 flows into the piston 3.

The nozzle holder 10 includes nozzle support portions 11, 11 protruding from a rear end portion of the nozzle holder 10 to left and right. Internal spaces of the pair of nozzle support portions 11, 11 communicate with an internal space of the nozzle holder 10. A valve (not illustrated) is disposed in the internal space of the nozzle holder 10. The cleaning liquid flown into the piston 3 is supplied to the internal space of the nozzle holder 10 and the valve is opened by the pressure of the cleaning liquid, so that the cleaning liquid flows into the nozzle support portions 11, 11.

The nozzles 4, 4 are supported at corresponding outer end portions of the nozzle support portions 11, 11. The nozzles 4, 4 are formed with corresponding injection ports 4a, 4a for injecting the cleaning liquid.

A front end portion of the nozzle holder 10 serves as an engaged portion 12 to which the nozzle cover 20 to be described later is coupled. As illustrated in FIG. 1, the engaged portion 12 is provided with a convex portion 13a (example of a first convex portion) for lance engagement on an upper surface thereof. The convex portion 13a protrudes upward. As illustrated in FIG. 2, the engaged portion 12 is provided with a convex portion 13b (example of a second convex portion) for lance engagement on a lower surface thereof. The convex portion 13b protrudes downward. The engaged portion 12 is provided with a pair of guiding portions 14a, 14a forward of the convex portion 13a on the upper surface. The pair of guiding portions 14a, 14a protrude upward. The engaged portion 12 is provided with a pair of guiding portions 14b, 14b forward of the convex portion 13b on the lower surface. The pair of guiding portions 14b, 14b protrude downward. The engaged portion 12 is provided with rotation restricting portions 15, 15 at both left and right end portions thereof. The rotation restricting portions 15, 15 protrude laterally (outward), respectively.

The engaged portion 12 is further provided with an abutted rib 16a (example of a third abutted rib) rearward of the convex portion 13a on the upper surface. The abutted rib 16a protrudes upward and extends in the left-right direction (circumferential direction of the nozzle holder 10). The engaged portion 12 is provided with an abutted rib 16b (example of a first abutted rib) rearward of the convex portion 13b on the lower surface. The abutted rib 16b protrudes downward and extends in the left-right direction (circumferential direction). The engaged portion 12 is provided with a pair of abutted ribs 17a, 17a (examples of the third abutted rib) rearward of the abutted rib 16a on the upper surface. The pair of abutted ribs 17a, 17a protrude upward and extend along live front-rear direction (axial direction of the nozzle holder 10). The pair of abutted ribs 17a, 17a are separated by a predetermined distance. Specifically, the pair of abutted ribs 17a, 17a are separated by a distance substantially the same as the width of the convex portion 13a. The engaged portion 12 is provided with a pair of abutted ribs 17b, 17b (examples of a second abutted rib) rearward of the abutted rib 16b on the lower surface. The pair of abutted ribs 17b, 17b protrude downward and extend along the front-rear direction (axial direction). The pair of abutted ribs 17b, 17b are separated by a predetermined distance. Specifically, the pair of abutted ribs 17b, 17b are separated by a distance substantially the same as the width of the convex portion 13b.

The nozzle cover 20 is coupled to the engaged portion 12 of the nozzle holder 10. The nozzle cover 20 includes a cover portion 21 that closes the opening 101 of the bumper 100, an engaging portion 30 protruding rearward from the cover portion 21, and bring-in portions 23 provided on left and right of the engaging portion 30. The cover portion 21, the engaging portion 30, and the bring-in portions 23 are integrated.

The cover portion 21 is formed in a substantially flat plate shape that is horizontally long. The cover portion 21 faces the front-rear direction. The engaging portion 30 is located at a central portion m the left-right direction on an inner surface (rear surface) side of the cover portion 21. The engaging portion 30 is formed in a substantially cylindrical shape.

The engaging portion 30 is formed with an engaging hole 31 in a position near a rear end in an upper surface thereof. The engaging hole 31 penetrates the upper surface of the engaging portion 30 in the up-down direction. On left and right of the engaging hole 31, slit-shaped guided portions 32a, 32a are opened in the front-rear direction. The engaging portion 30 is formed with a cutout portion 33 at a rear end portion in a lower surface thereof. The cutout portion 33 is cut out forward. On left and right of the cutout portion 33, slit-shaped guided portions 32b, 32b are opened in the front-rear direction. A pair of abutting ribs 34, 34 extending in the front-rear direction are provided between the cutout portion 33 and the left and right guided portions 32b, 32b. Rear end portions of the pair or abutting ribs 34, 34 are located rearward of a part of the upper surface where the engaging hole 31 is provided. The engaging portion 30 is formed with slit-shaped rotation restricted portions 35, 35 on corresponding side surfaces thereof. The slit-shaped rotation restricted portions 35, 35 are opened in the front-rear direction.

The bring-in portions 23, 23 are located on left and right of the engaging portion 30 and protrude rearward from the cover portion 21. The bring-in portions 23, 23 are used to position the nozzle cover 20 relative to an attachment bracket (not illustrated) for attaching the cleaner 1 to the bumper 100.

Figure 3:
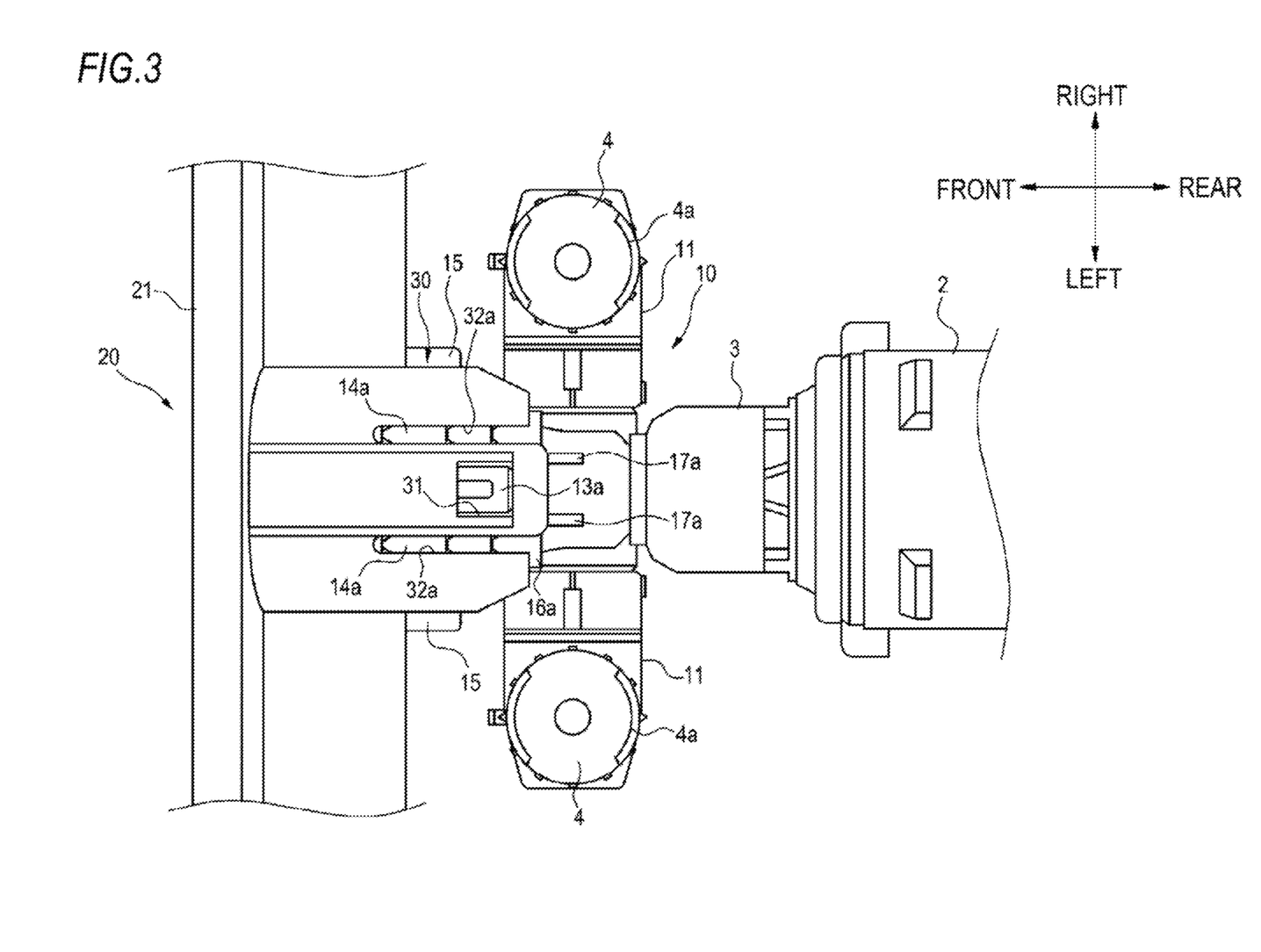
FIG. 3 is an enlarged lop view illustrating a state in which a nozzle cover of the vehicle cleaner is attached to a nozzle holder.

Next, an attachment state of the nozzle cover 20 to the nozzle holder 10 will be described with reference to FIGS. 3 and 4.

The nozzle cover 20 is moved rearward relative to the nozzle holder 10, and the engaging portion 30 of the nozzle cover 20 is engaged with the engaged portion 12 of the nozzle holder 10, so that the nozzle cover 20 is coupled to the nozzle holder 10. Specifically, as illustrated in FIGS. 3 and 4. the guiding portions 14a, 14a formed on the upper surface of the engaged portion 12 are inserted into the guided portions 32a, 32a formed on the upper surface of the engaging portion 30, and the guiding portions 14b, 14b formed on the lower surface of the engaged portion 12 are inserted into the guided portions 32b, 32b formed on the lower surface of the engaging portion 30, so that the nozzle cover 20 is guided to the nozzle holder 10. The convex portion 13a formed on the upper surface of the engaged portion 12 is engaged with the engaging hole 31 formed in the upper surface of the engaging portion 30, so that the nozzle cover 20 is engaged with the nozzle holder 10. At this time, the convex portion 13b formed on the lower surface of the engaged portion 12 is inserted into the cutout portion 33 formed in the lower surface of the engaging portion 30. By inserting the rotation restricting portions 15, 15 of the engaged portion 12 into the corresponding rotation restricted portions 35, 35 of live engaging portion 30. the rotation of the nozzle cover 20 relative to the nozzle holder 10, that is, the rotation of the nozzle cover 20 in a direction about the axis of the piston 3 is restricted.

Figure 5:
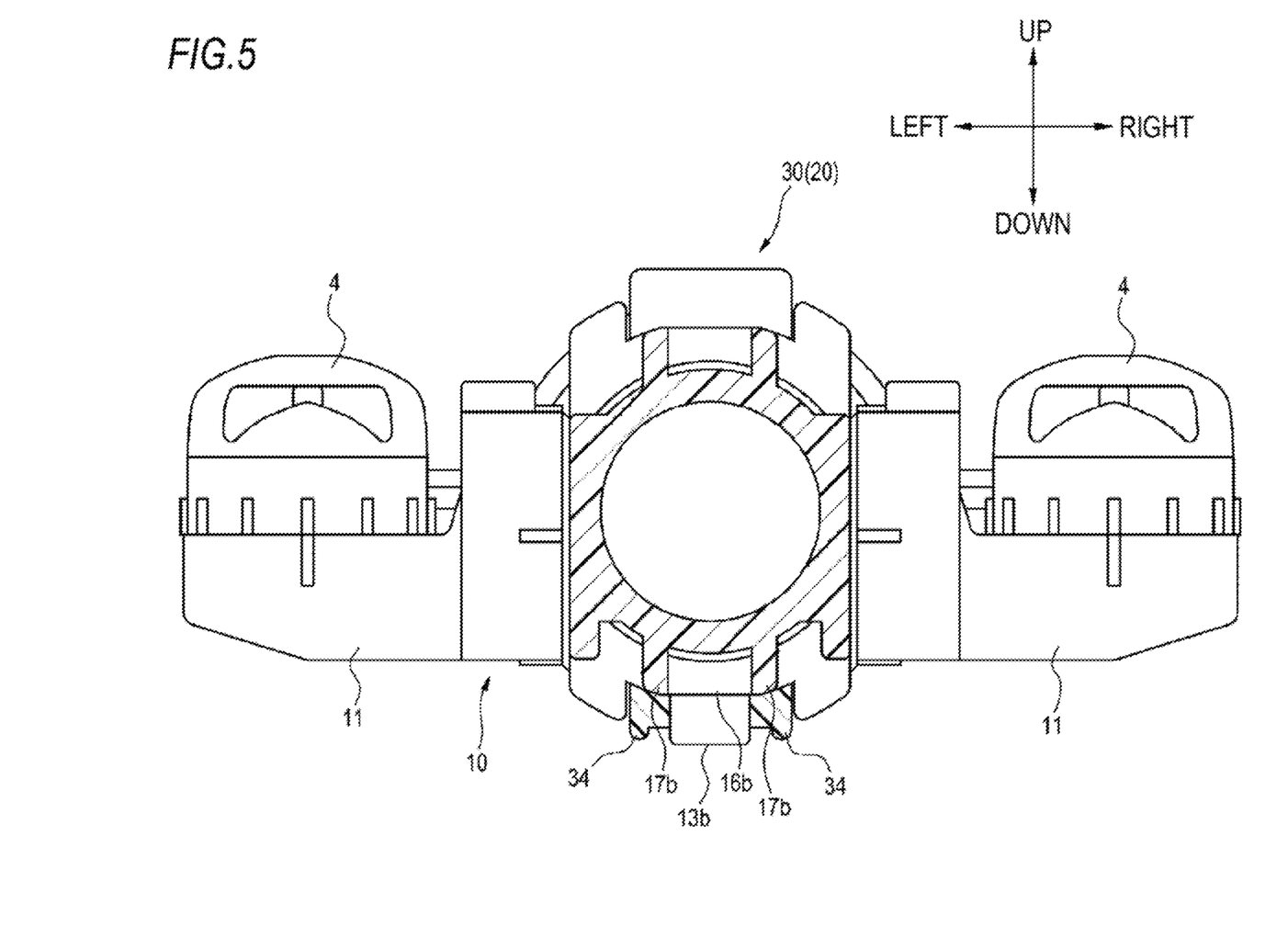
FIG. 5 is a sectional rear view illustrating abutted ribs of the nozzle cover and abutting ribs of the nozzle holder in the state of FIG. 3.

FIG. 5 is a sectional rear view illustrating the abutting ribs 34, 34 of the nozzle cover 20 and the abutted ribs 17b, 17b of the nozzle holder 10 in a state where the nozzle cover 20 is engaged with the nozzle holder 10.

Figure 4:
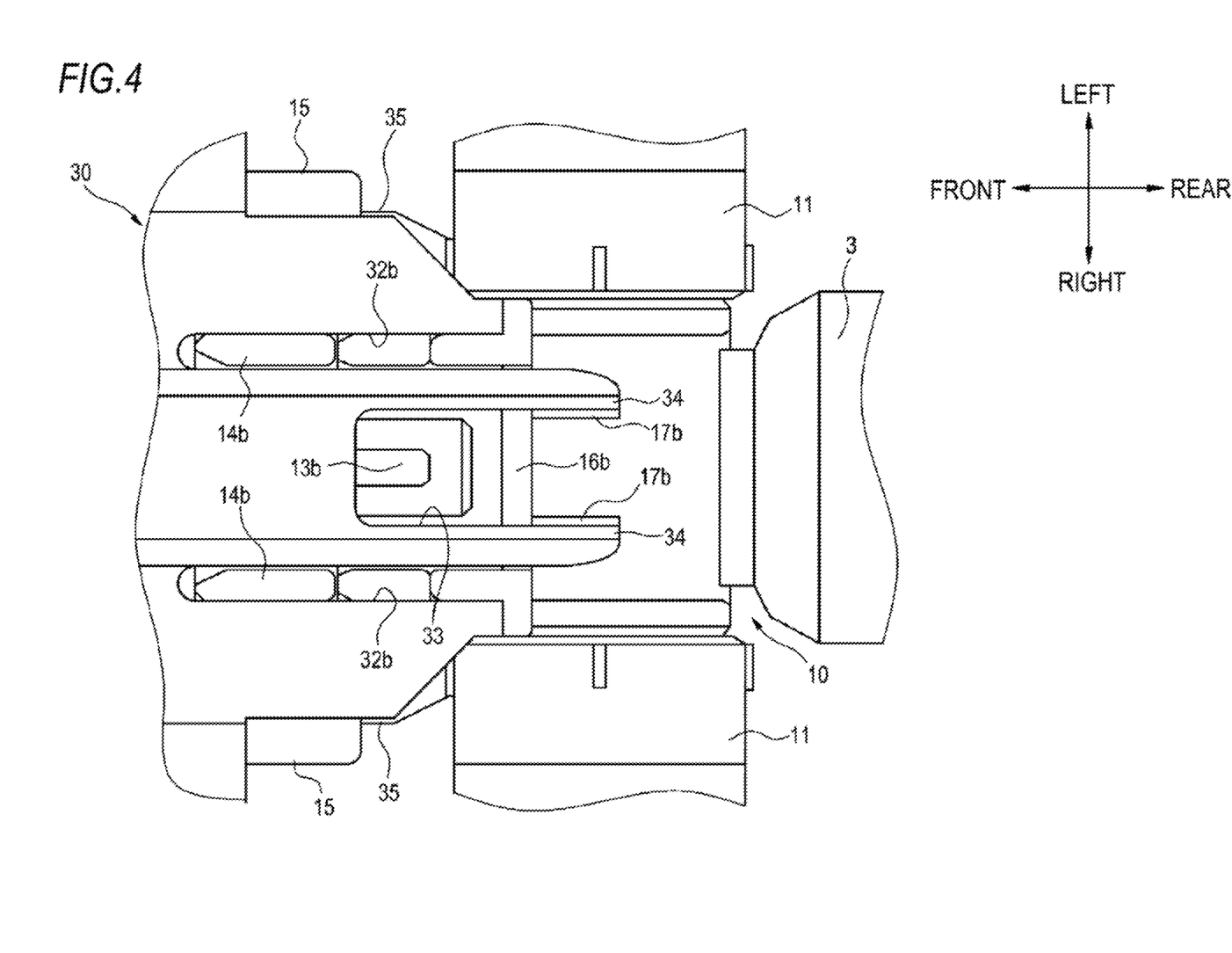
FIG. 4 is an enlarged bottom view of the state in FIG. 3.

As illustrated in FIGS. 4 and 5, in the state where the nozzle cover 20 is engaged with the nozzle holder 10, the abutting ribs 34, 34 formed on the lower surface of the engaging portion 30 of the nozzle cover 20 abut against the abutted rib 16b extending in the left-right direction on the lower surface of the nozzle holder 10, and abut against the pair of abutted ribs 17b, 17b extending rearward from the abutted rib 16b.

Figure 6:
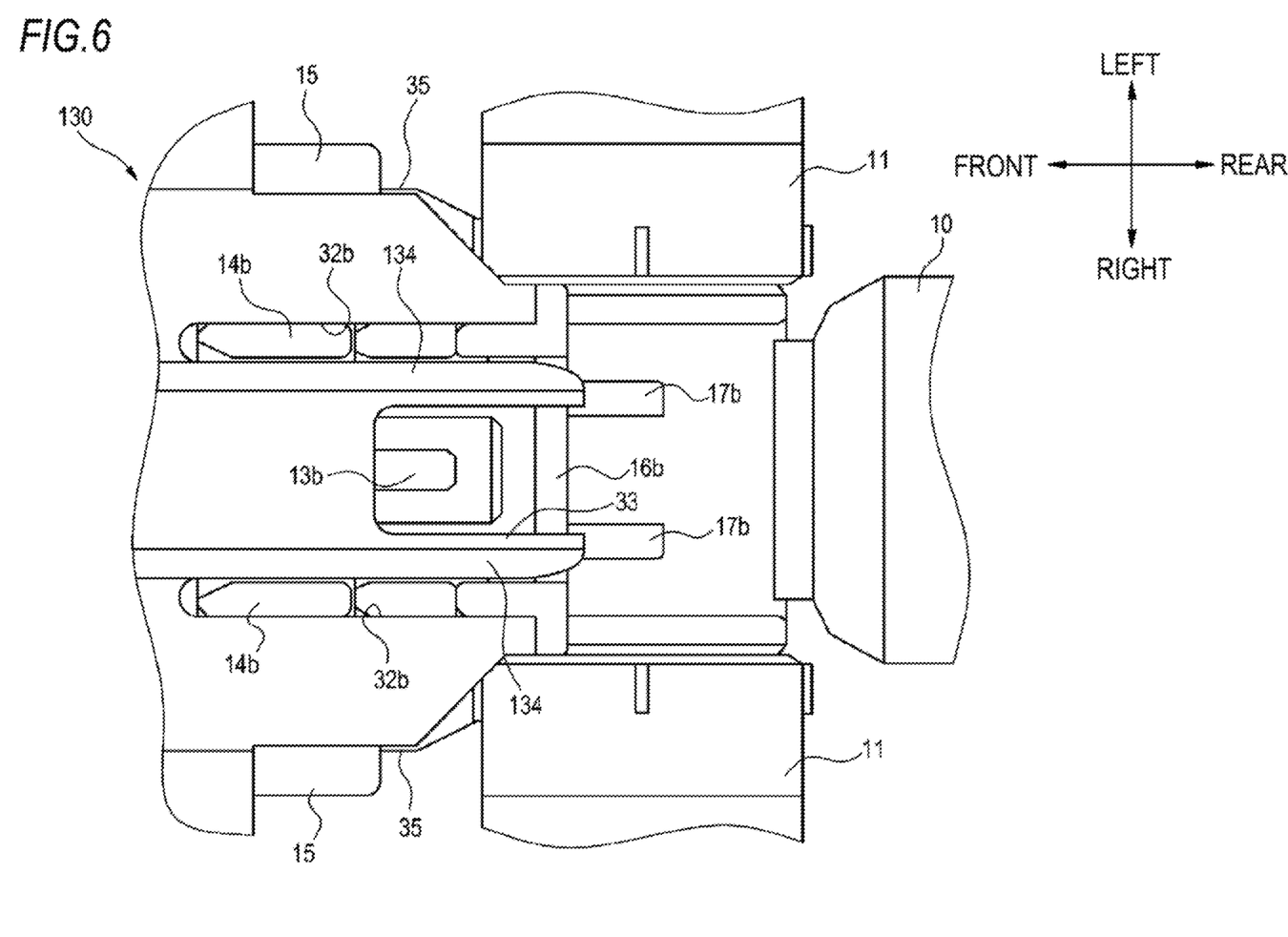
FIG. 6 is an enlarged bottom view of a vehicle cleaner according to a modification.

The lengths of the abutting ribs 34, 34 formed on the lower surface of the engaging portion 30 are appropriately changeable according to the configuration of the cleaner 1. For example, as for an engaging portion 130 of a nozzle cover according to a modification illustrated in FIG. 6, abutting ribs 134, 134 formed on a lower surface of the engaging portion 130 may have a length sufficient to at least abut against the abutted rib 16b extending in the left-right direction on the lower surface of the nozzle holder 10.

In the state where the nozzle cover 20 is engaged with the nozzle holder 10 and the attachment bracket (not illustrated) is engaged with the cylinder 2, the cleaner 1 configured as described above is inserted into the opening 101 formed in the bumper 100 from front, thereby being attached to the bumper 100. The opening 101 is closed by the cover portion 21 of the nozzle cover 20 attached to the nozzle holder 10. That is, a front surface of the cover portion 21 and a front surface of the bumper 100 are located on substantially the same plane.

Figure 7A:
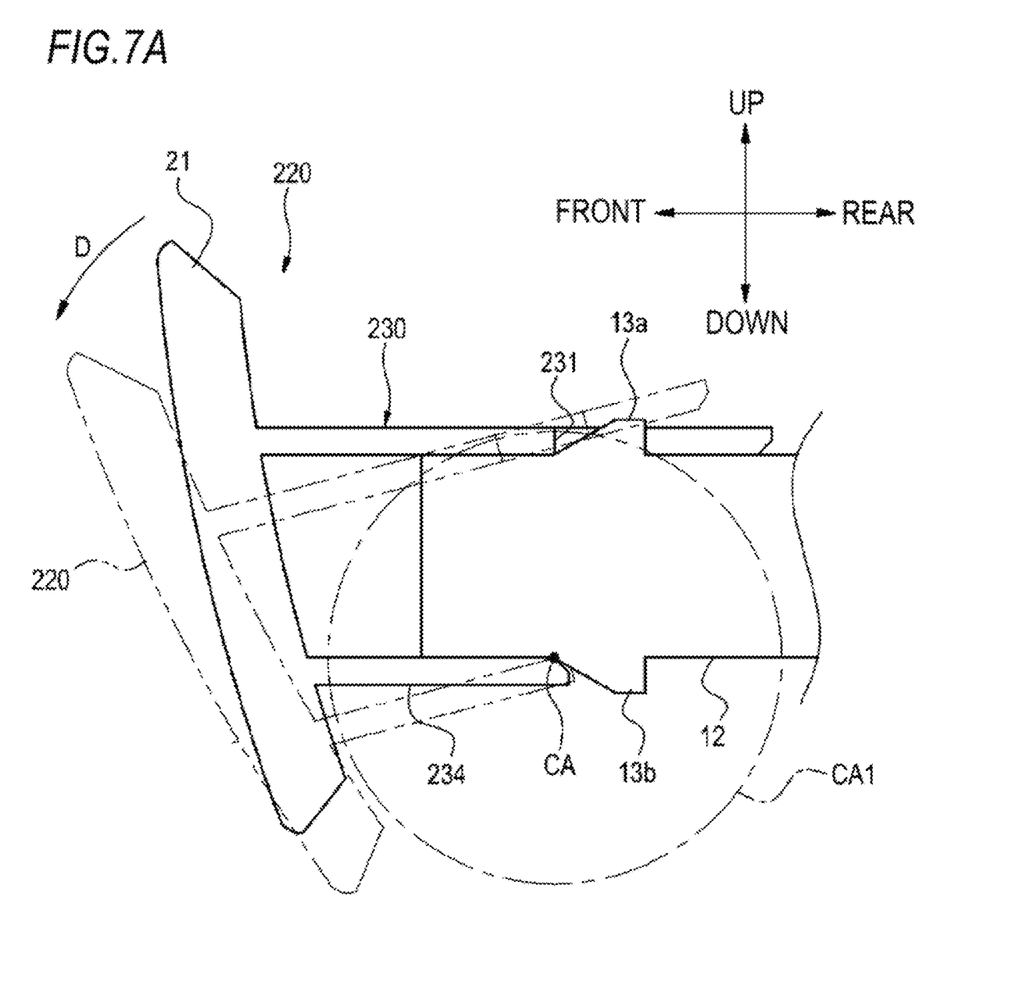
FIG. 7A is a schematic view illustrating a state in which a convex portion of a nozzle holder is engaged with an engaging hole of a nozzle cover according to a comparative example.
Figure 7B:
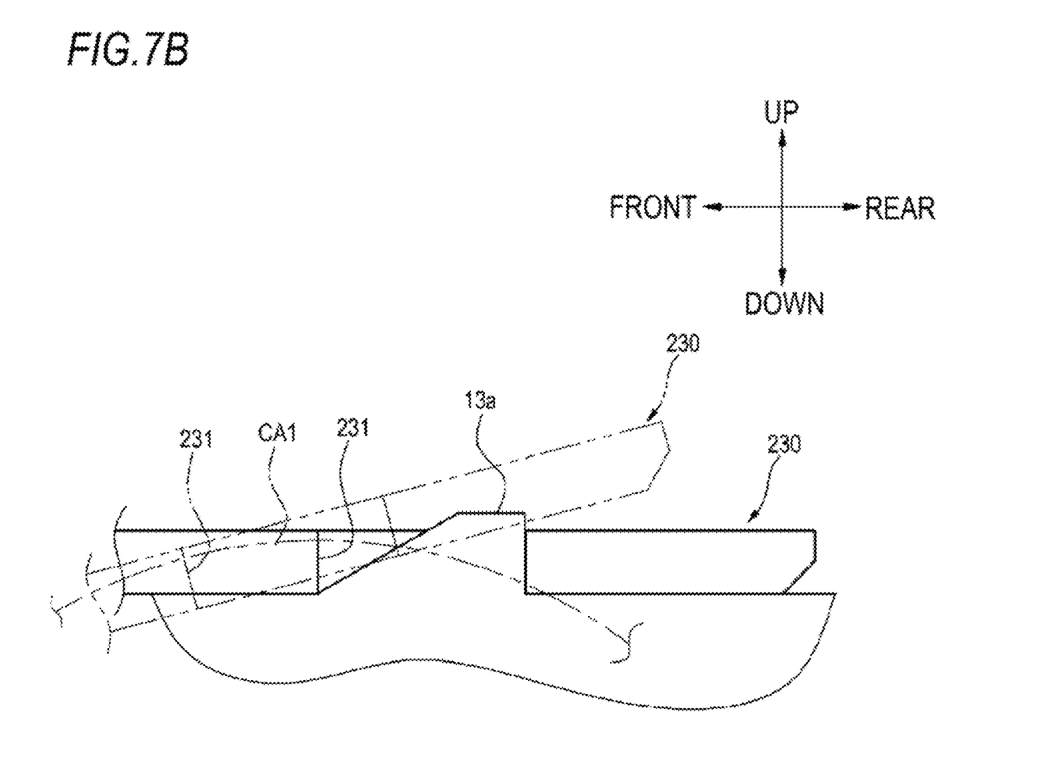
FIG. 7B is an enlarged view of a part of FIG. 7A.
Figure 8A:
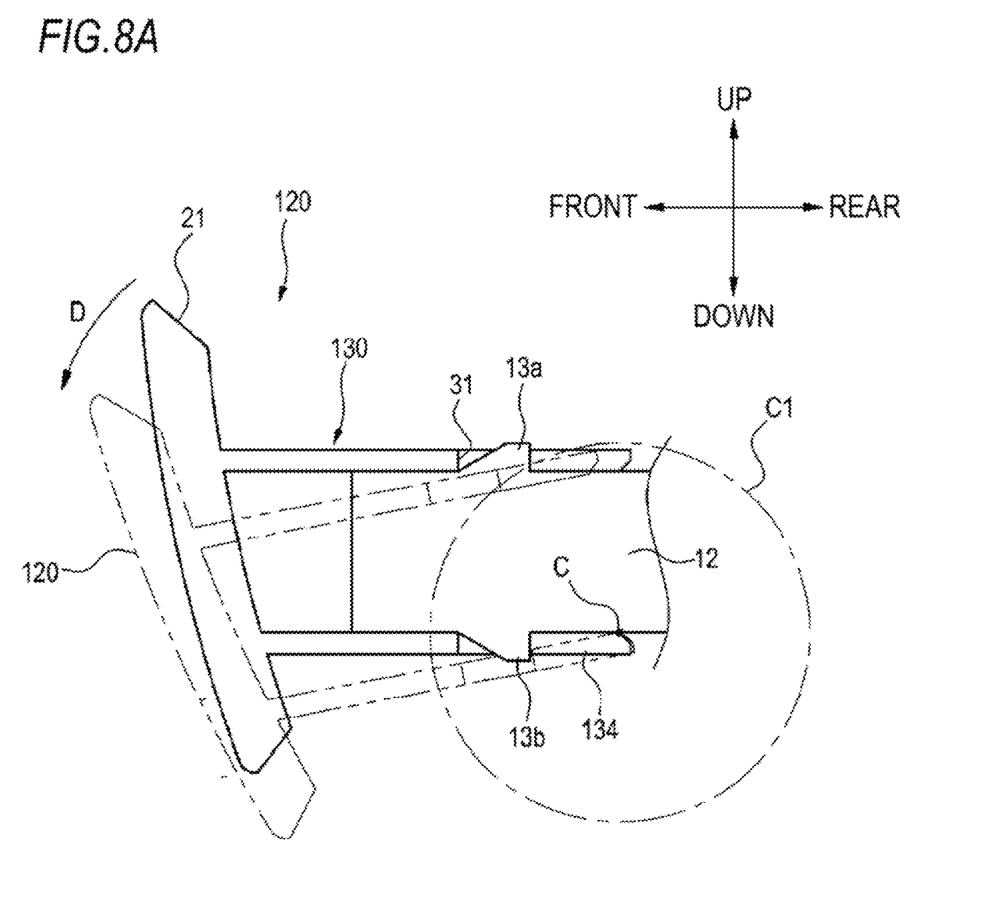
FIG. 8A is a schematic view illustrating a state in which a convex portion of a nozzle holder is engaged with an engaging hole of a nozzle cover according to the modification of FIG. 6.
Figure 8B:
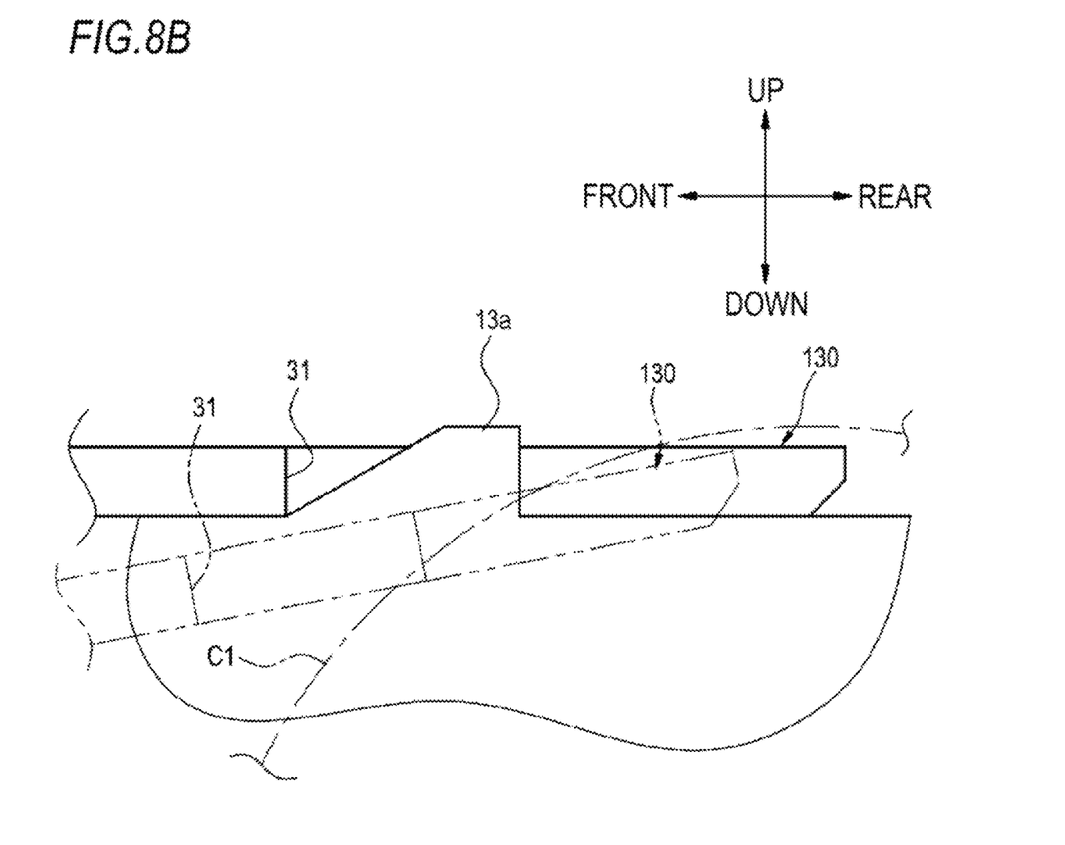
FIG. 8B is an enlarged view of a part of FIG. 8A.

FIG. 7A is a schematic view illustrating a state in which the convex portion 13a of the nozzle holder 10 is engaged with the engaging hole 31 of a nozzle cover 220 according to a comparative example. FIG. 7B is an enlarged view of a part of FIG. 7A. FIG. 8A is a schematic view illustrating a state in which the convex portion 13a of the nozzle holder 10 is engaged with the engaging hole 31 of a nozzle cover 120 according to the modification (see FIG. 6) of the present embodiment. FIG. 8B is an enlarged view of a part of FIG. 8A.

As illustrated in FIG. 7A, abutting ribs 234 formed on a lower surface of the nozzle cover 220 according to the comparative example are shorter than the abutting ribs 134 formed on a lower surface of the nozzle cover 120 according to the modification (see FIG. 6) of the present embodiment. That is, rear ends of the abutting ribs 234 of the comparative example are located forward of rear ends of the abutting ribs 134 of the modification illustrated in FIG. 6.

In the comparative example, when a force is applied to the nozzle cover 220 engaged with the nozzle holder 10 in a direction indicated by an arrow D in FIG. 7A, that is, when a force that twists the cover portion 21 downward is applied, a rotation center CA of the nozzle cover 220 is in substantially the same position as a position where an engaging hole 231 engages with the convex portion 13a in the front-rear direction. For this reason, when the nozzle cover 220 rotates about the rotation center CA along a rotation trajectory CA1, as illustrated in FIG. 7B, the engaging hole 231 is filled upward, an engagement state between the engaging hole 231 and the convex portion 13a is released, and the nozzle cover 220 may be detached from the nozzle holder 10.

On the other hand, in the configuration of the nozzle cover 120 according to the modification of the present embodiment, when a force that twists the cover portion 21 downward as indicated by the arrow D in FIG. 8A is applied to the nozzle cover 120 engaged with the nozzle holder 10, a rotation center C of the nozzle cover 120 is located rearward of a position where the engaging hole 31 engages with the convex portion 13a in the front-rear direction. For this reason, even when the nozzle cover 120 rotates about the rotation center C along a rotation trajectory C1, as illustrated in FIG. 8B, the engaging hole 31 would not be lifted upward, and the engagement between the engaging hole 31 and the convex portion 13a would not be released.

Similarly, in the configuration of the nozzle cover 20 according to the present embodiment as illustrated in FIG. 4, rear ends of the abutting ribs 34 of the engaging portion 30 are located further rearward of the rear ends of the abutting ribs 134 of the nozzle cover 120 according to the modification. For this reason, even when a downward force as illustrated in FIG. 8A is applied to the nozzle cover 20, the engaging hole 31 would not be lifted upward, and the engagement between the engaging hole 31 and the convex portion 13a would not be released.

As described above, the cleaner 1 according to the present embodiment includes the cylinder 2 provided in the opening 101 formed in the bumper 100, the piston 3 supported to be movable forward and backward in the front-rear direction relative to the cylinder 2, the nozzle holder 10 provided in a vicinity of a front end of the piston 3, the nozzles 4, 4 supported by the nozzle holder 10 and configured to inject the cleaning liquid to an object to be cleaned in a state where the piston 3 protrudes from the opening 101, and the nozzle cover 20 provided at a front end of the nozzle holder 10 and configured to close the opening 101 in a state where the piston 3 is drawn into the cylinder 2. The nozzle cover 20 includes the cover portion 21 that closes the opening 101, and the engaging portion 30 that protrudes from the cover portion 21 toward the piston 3 (rear side) and engages with the nozzle holder 10. The engaging portion 30 of the nozzle cover 20 is provided with the engaging hole 31 (example of a concave portion) on the upper surface (example of one surface of the engaging portion), and the abutting ribs 34, 34 on the lower surface (example of the other surface of the engaging portion) of the engaging portion 30. The nozzle holder 10 is provided with the convex portion 13a (example of a first convex portion) that engages with the engaging hole 31 on the upper surface (example of one surface of the nozzle holder), and the abutted rib 16b (example of a first abutted rib) against which the abutting ribs 34, 34 abut on the lower surface (example of the other surface of the nozzle holder) of the nozzle holder 10. Accordingly, the nozzle cover 20 can be engaged with the nozzle holder 10 by lance engagement, and on a side opposite to the lance engagement portion, the abutting ribs 34, 34 provided on the engaging portion 30 of the nozzle cover 20 abut against the abutted rib 16b provided on the nozzle holder 10. Accordingly, it is possible to improve the ease of assembly of the nozzle cover 20 to the nozzle holder 10.

If abutment portions of the abutting ribs 34, 34 and the abutted rib 16b constitute the lance engagement portion, two lance engagement portions are provided. Therefore, the ease of assembly may be inferior to that of the present embodiment. In addition, when the lance engagement portions are provided in the same position in the up-down direction, it is necessary to release the two lance engagement portions at the same time when the nozzle cover is to be detached from the nozzle holder. On the other hand, in the cleaner 1 according to the present embodiment, the abutment portions (the abutting ribs 34 and 34 and the abutted rib 16b) are provided on the side opposite to the lance engagement portion (the engaging hole 31 and the convex portion 13a). Therefore, it is possible to improve the workability of removal.

In the cleaner 1 according to the present embodiment, the abutted rib 16b against which the abutting ribs 34, 34 abut is provided rearward of the convex portions 13a, 13b (on a rear end side of the piston 3). Accordingly, for example, even when a downward gouging force is applied to the nozzle cover 20, the engaging hole 31 would not be lifted upward since a position rearward of the convex portions 13a, 13b of the abutting ribs 34 serves as the rotation center. For this reason, it is possible to prevent the engaging hole 31 from disengaging from the first convex portion 13a, and to improve the holding strength (engagement property) of the nozzle cover 20 by the nozzle holder 10.

In the cleaner 1 according to the present embodiment, the nozzle holder 10 is provided with the pair of abutted ribs 17b, 17b (examples of a second abutted rib) extending rearward from the abutted rib 16b along the pair of abutting ribs 34, 34 of the nozzle cover 20. Accordingly, the abutting ribs 34, 34 abut not only against the abutted rib 16b but also against the abutted ribs 17b. Therefore, when a downward gouging force is applied to the nozzle cover 20, the rear end portions of the abutting ribs 34 provided further rearward of the position of the abutted rib 16b serves as the rotation center. For this reason, it is possible to more reliably prevent the nozzle cover 20 from coming off the nozzle holder 10, and to further increase the holding strength of the nozzle cover 20 by the nozzle holder 10.

In the cleaner 1 according to the present embodiment, the nozzle holder 10 is provided with the convex portion 13b for lance engagement on the lower surface (the other surface), and the abutted rib 16a on the upper surface (one surface) of the nozzle holder. Accordingly, in the assembly direction as illustrated in FIGS. 3 and 4, the nozzle cover 20 can be engaged with the nozzle holder 10 with the up-down direction of the nozzle cover 20 reversed. For this reason, the assembly direction of the nozzle cover 20 to the nozzle holder 10 is not limited, and versatility of the cleaner 1 can be improved.

Although the embodiment of the present disclosure has been described above, it is needless to say that the technical scope of the present disclosure should not be interpreted as being limited to the description of the present embodiment. It is to be understood by those skilled in the art that the present embodiment is merely an example and various modifications may be made within the scope of the inventions described in the claims. The technical scope of the present disclosure should be determined based on the scope of the inventions described in the claims and the scope of equivalents thereof. That is, the present disclosure is not limited to the embodiment described above and may be appropriately modified, improved, and the like. In addition, materials, shapes, dimensions, numerical values, forms, numbers, arrangement locations, and the like of constituent elements in the above-described embodiment are arbitrary and are not limited as long as the present disclosure can be achieved.

In the above-described embodiment, the pair of abutting ribs 34, 34 abut against the pair of abutted ribs 17b, 17b in the state where the nozzle cover 20 is attached to the nozzle holder 10. Alternatively, the present disclosure is not limited thereto. Only one abutting rib may be provided on the nozzle cover 20, and the one abutting rib may abut against one abutted rib extending in the front-rear direction.

The present application is based on Japanese Patent Application No. 2019-11272 filed on Jan. 25, 2019, and the contents thereof are incorporated herein as reference.

The invention claimed is:

1. A vehicle cleaner comprising:
   a cylinder provided in an opening formed in a part of a vehicle body panel of a vehicle;
   a piston supported to be movable forward and backward relative to the cylinder;
   a nozzle holder provided in a vicinity of a front end of the piston;
   a nozzle supported by the nozzle holder and configured to inject a cleaning liquid to an object to be cleaned of the vehicle in a state where the piston protrudes from the opening; and
   a nozzle cover provided at a front end of the nozzle holder and configured to close the opening in a state where the piston is drawn into the cylinder,
   wherein the nozzle cover includes a cover portion that closes the opening, and an engaging portion that protrudes from the cover portion toward the piston and engages with the nozzle holder,
   wherein the engaging portion is provided with a concave portion for lance engagement on a first surface thereof, and an abutting rib on a second surface thereof opposite to the first surface,
   wherein the nozzle holder is provided with a first convex portion on a first surface thereof, and a first abutted rib on a second surface thereof opposite to the first surface; and
   wherein the first convex portion engages with the concave portion, and the first abutted rib abuts against the abutting rib.

2. The vehicle cleaner according to claim 1, wherein the first abutted rib is provided on a rear end side of the piston relative to the first convex portion.

3. The vehicle cleaner according to claim 2, wherein the nozzle holder is provided with a second abutted rib extending from the first abutted rib to the rear end side of the piston in a position corresponding to the abutting rib.

4. The vehicle cleaner according to claim 3, wherein the second abutted rib includes a pair of second abutted ribs separated by a predetermined distance, and
   wherein the abutting rib includes a pair of abutting ribs in positions corresponding to the pair of second abutted ribs.

5. The vehicle cleaner according to claim 3, wherein the nozzle holder is provided with a second convex portion for lance engagement on the second surface, and a third abutted rib on the first surface of the nozzle holder.

6. The vehicle cleaner according to claim 1, wherein the nozzle holder is provided with a second convex portion for lance engagement on the second surface, and a second abutted rib on the first surface of the nozzle holder.

* * * * *